United States Patent [19]

Hemminger et al.

[11] Patent Number: 4,888,697

[45] Date of Patent: Dec. 19, 1989

[54] ELECTRONIC CONTROL APPARATUS WITH DEFINED RESET FUNCTION

[75] Inventors: Hermann Hemminger, Markgröningen; Eugen Joos, Freiberg; Werner Jundt, Ludwigsburg; Peter Werner, Wiernsheim, all of Fed. Rep. of Germany

[73] Assignee: Robert Bosch GmbH, Stuttgart, Fed. Rep. of Germany

[21] Appl. No.: 126,940

[22] PCT Filed: Sep. 19, 1986

[86] PCT No.: PCT/DE86/00379

§ 371 Date: Oct. 1, 1987

§ 102(e) Date: Oct. 1, 1987

[87] PCT Pub. No.: WO87/04758

PCT Pub. Date: Aug. 13, 1987

[30] Foreign Application Priority Data

Feb. 1, 1986 [DE] Fed. Rep. of Germany ....... 3603082

[51] Int. Cl.⁴ ................... G06F 1/04; G06F 11/00; G05B 15/02
[52] U.S. Cl. ................ 364/431.11; 371/12; 307/296.4
[58] Field of Search ........ 364/431.11, 431.12, 364/431.10; 371/12; 307/296.3, 296.4, 296 R

[56] References Cited

U.S. PATENT DOCUMENTS

| | | | |
|---|---|---|---|
| 4,363,092 | 12/1982 | Abo et al. | 371/12 X |
| 4,528,629 | 7/1985 | Breitling | 364/431.11 |
| 4,562,544 | 12/1985 | Bonitz et al. | 364/431.11 |
| 4,587,939 | 5/1986 | Hemminger et al. | 364/431.11 X |
| 4,625,309 | 11/1986 | Nitschke | 371/12 |
| 4,629,907 | 12/1986 | Kosak | 364/431.11 X |
| 4,696,002 | 9/1987 | Schleupen et al. | 371/12 |

Primary Examiner—Eugene R. LaRoche
Assistant Examiner—Benny Lee
Attorney, Agent, or Firm—Michael J. Striker

[57] ABSTRACT

An apparatus for resetting computing devices, particularly devices for fuel proportioning or fuel injection, for adjusting ignition timing, and the like, which are controlled by microprocessors, includes a resetting circuit to evaluate the change in the switching state of the ignition lock switch of the motor vehicle when restarted. The evaluation is effected independently of the supply voltage still at the computing device due to a self-sustaining circuit, by means of an integrated differentiation and the differentiation voltage is fed to a comparator at whose output the reset pulse is formed.

6 Claims, 1 Drawing Sheet

ELECTRONIC CONTROL APPARATUS WITH DEFINED RESET FUNCTION

PRIOR ART

The invention is based on an apparatus for resetting computing devices, microprocessors ($\mu$C), single-purpose computers, memories, and the like, which after switching off automatically remain connected for a predetermined period of time to a supply voltage, and the apparatus resets the devices by a resetting pulse.

For the resetting of computing devices, microprocessors, and the like, it is known (US-PS 4 296 338) to generate a resetting signal which reacts substantially immediately when the supply voltage for the computing device or the device drops below a predetermined reference value. In addition to this, an external capacitor is discharged and a second resetting signal (reset signal) is generated until the capacitor has again reached a predetermined load state. The clock oscillator of the microprocessor is accordingly given sufficient time to stabilize itself.

Furthermore, it is known (DE-OS 30 35 896, DE-OS 31 19 117) to generate a reset pulse when the microprocessor is turned on so that it is reset in a defined initial state. However, a problem with this is that reset pulses are not generated, for example, when the computer attains an undefined state because of voltage surges and can no longer continue to operate, or when the clock oscillator of the microprocessor is not yet started at the point in time when a reset pulse is generated when the microprocessor is turned on.

In a particular embodiment form of a microprocessor assigned to a fuel proportioning or fuel injection system, it is provided that the microprocessor itself must cut off its voltage supply, for example, by means of a relay; that is, it is also ensured after the motor vehicle, which is operated by the system, is stopped and turned off that microprocessor-controlled systems in the motor vehicle, for example, injection systems, can still work for a period of time and subsequently turn themselves off (for example, free combustion in the so-called LH-Jetronic). In such microprocessor-controlled systems in motor vehicles, an area in which the present invention also belongs, it is not sufficient, as in the known circuits, to ensure that a reset pulse is fed to the microprocessor when the current supply is interfered with or interrupted, or only when the clock oscillator of the microprocessor has already been started. Faulty operation of the microprocessor (for example, an undefined program run) can also occur during a failure of the microprocessor monitoring (so-called watchdog), which is normally available, and cannot be overcome in the usual manner. since the device, at least the computing device, also still supplies itself with voltage after switching off.

Therefore, the invention has the object of providing a reliable resetting in such a microprocessor-controlled (injection) system, which cuts off its voltage supply itself by means of a relay, for example, when faulty operations of any type occur for whatever reason.

SUMMARY OF THE INVENTION

The invention meets this object by providing an evaluation circuit connected to the terminal of the ignition lock switch of the motor vehicle to produce a reset pulse for the computing devices in dependency on the change in the switching state of the switch, and independently of the connection of a supply voltage to the computing devices. This solution has the advantage that, although the microprocessor-controlled system maintains its voltage in the event of being turned off, that is, does not actually allow itself to be shut off, a resetting is nevertheless possible in the case of an error. Accordingly, it is possible for the driver of a motor vehicle, for example, to produce normal conditions again by means of restarting when there are disturbances in the program run, which can occur when an undefined program run occurs during the driving operation despite the microprocessor monitoring circuit (watchdog). During such disturbances in the program run, it can be safely assumed that the vehicle will run noisily or the engine will die, so that the invention cooperates, as it were, with the driver, who attempts to put the vehicle in operation again by means of restarting through actuation of the ignition lock switch, and, by means of this step, the invention effects a resetting of the microprocessor or the computing device. Therefore, it is possible to return to normal operation merely by means of restarting in this way.

The invention is also suitable for such microprocessor-controlled systems in which, as a result of a disturbance of whatever cause or effect, an undefined program run occurs which also causes an undefined control of all microprocessor-outputs, including the output for the main relay. Therefore, even when the switching off of the vehicle is desired, for example, in microprocessor-controlled systems in which a switching off of the microprocessor itself results by means of this, it is possible that this possibility will be prevented by the microprocessor itself, that is, the system cannot be switched off. In this case, it would also not be possible to restart, since the so-called "power on reset" pulse cannot be triggered.

Moreover, it is advantageous that the invention, which effects an integrating differentiation of a positive flank or leading edge of the switching pulse, wherein the switching pulse for the resetting, which switching pulse is to be evaluated, is generated by means of actuating the ignition lock switch, ensures that the reset pulse is generated only once and does not react to interference which can be negative or positive voltage peaks, voltage surges to 0 V, or long voltage magnifications.

Advantageous developments and improvements of the reset circuit indicated in the main claim are made possible by means of the steps indicated in the subclaims.

DRAWING

An embodiment example of the invention is shown in the drawing and explained in more detail in the following description.

DESCRIPTION OF THE EMBODIMENT EXAMPLES

Figure 1:
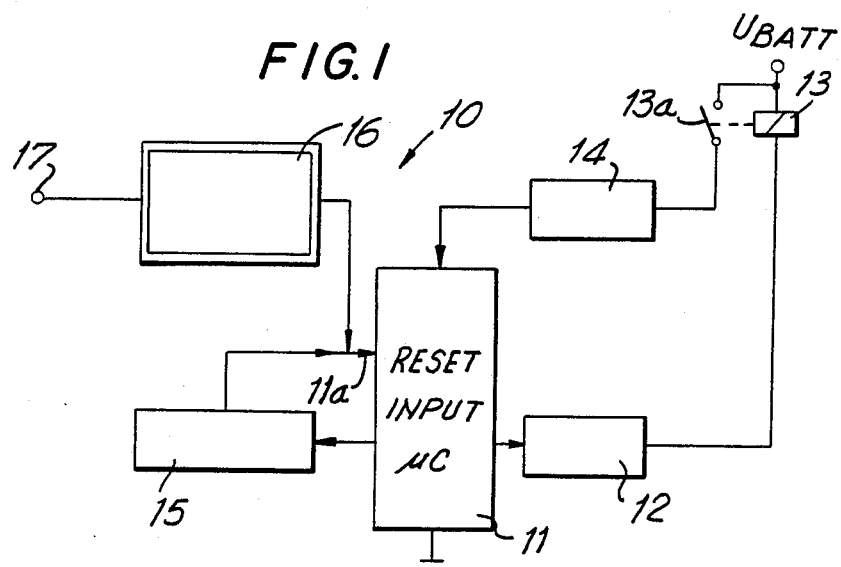
FIG. 1 shows a general block diagram of a computing device, preferably a microprocessor ($\mu$C) with assigned external switching stages which make it possible for the microprocessor to switch off its voltage supply itself by means of a relay.

The computing device 10 shown in FIG. 1 comprises the actual microcomputer or microprocessor 11. By means of a switching stage 12, which is assigned to one of its outputs, and a relay 13 (so-called main relay), which is arranged externally or internally, the microprocessor 11 is able to switch off the supply voltage (in this case, battery voltage $U_{Batt}$) connected to it via a voltage stabilization 14 according to its own evaluation, depending on the requirements which are set for it by the microprocessor in the control of determined motor vehicle systems (for example, motor vehicle injection systems, ignition timing regulators, control for automatic transmissions, and the like). Therefore, the microprocessor 11 is able to maintain its supply voltage by means of the self-sustaining circuit, which consists of a switching stage 12, main relay 13 with relay contact 13a, and voltage stabilization circuit 14, for a determined period of time, which can be used for the free combustion in the so-called LH-Jetronic fuel injection systems, for example, or which makes it possible to finish other concluding tasks, and then to interrupt the supply voltage to the main relay 13 by means of a corresponding control of the switching stage 12, so that the relay contact 13a is opened due to a drop of the relay 13, and the voltage supply $U_{Batt}$ is cut off in its entirety from the system.

The microprocessor 11 is usually assigned its own monitoring system 15, which can be designated as a so-called watchdog and which monitors the orderly operation of the microprocessor 11 and supplies a reset pulse to the reset input 11a when the watchdog circuit 15 itself determines irregular behavior.

However, in microprocessor-controlled systems it is possible for an indeterminate program run to occur during the driving operation because of interferences, despite the microprocessor monitoring circuit 15. This indeterminate program run can result in an indeterminate control of all microprocessor outputs, including the output by means of which the microprocessor 11 controls the switching stage 12 and, accordingly, the main relay. Accordingly, it may not be possible to switch off the system even when the switching off of the vehicle operated with such a computing device is desired, wherein it is also not possible to restart, since the so-called "power on reset" pulse cannot be triggered. In other words, in computing devices and microprocessors there is the risk that the system cannot be switched off in case of error if this system is not able to control a main relay for its own voltage supply.

Therefore, the invention provides a resetting circuit block 16 which acts on the reset input 11a of the microprocessor 11 parallel to the monitoring system 15 and can ensure that a reset pulse can also be generated during the operation of a motor vehicle if the microprocessor itself continues to be connected to the power supply voltage $U_{Batt}$ to. The invention does not offer the solution, obvious per se, of cutting off the supply voltage of the microprocessor simply by means of switching off the vehicle and then, when switching on the vehicle again by means of the so-called power on reset pulse, automatically switching on and resetting the microprocessor again simultaneously.

According to the invention, the reset circuit block 16 evaluates the voltage changes at the ignition lock switch, that is, at the connection or terminal of a motor vehicle designated by reference numeral 17 which always supplies a positive leading edge or flank if, when in case of interference in the program run, the driver first switches off the ignition and then attempts to restart. Accordingly, a positive voltage jump occurs at the terminal 17 and is converted into a reset pulse for the microprocessor 11 by means of an integrating evaluation in the reset circuit block 16.

Figure 2:
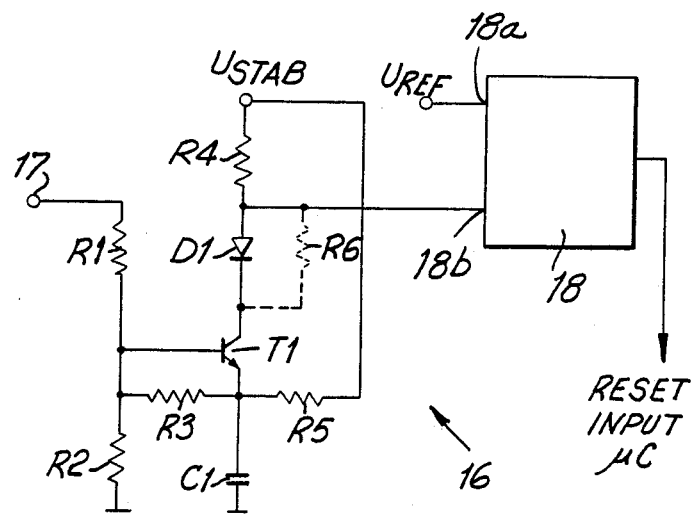
FIG. 2 shows in detail the circuit for producing the reset pulse in detail.

In particular, as shown in FIG. 2, the reset circuit block 16 comprises a comparator 18, a reference voltage Uref being connected to one of its inputs, while a variable voltage is supplied to its other input, which variable voltage results from the interaction of circuit components, explained in the following, when the ignition lock switch terminal 17 is switched on. The comparator 18 always generates a reset signal at its output and supplies it to the reset input of the microprocessor 11 when the voltage at its other input 18b (the reference voltage input is designated by 18a) exceeds the reference voltage even only for a short time, of course, the opposite conditions can also be given, according to the construction of the circuit and the polarity of the circuit elements employed.

The circuit elements for the conversion and evaluation of the voltage jump at the ignition lock switch terminal, which are connected with the input 18b, comprise the series connection of a resistor R4 with a semiconductor switching element, namely, transistor T1, whose emitter is connected to ground or a negative supply voltage via a capacitor C1. A diode D1, which conducts in the positive direction, can also be connected between the resistor R4 and the collector of the transistor T1, but this diode can be dispensed with or can be substituted with a resistor R6 which is parallel to the diode D1 and is indicated in dashed lines. The resistor R4 is connected to stabilized supply voltage Ustab and the connection point of resistor R4 with the collector of the transistor T1, or of the diode D1, is connected to the input 18b of the comparator 18 to apply thereto a variable signal. A series connection of a resistor R1 with a resistor R2 is provided between terminal 17 and ground, and the connection point of these two resistors is connected with the base of the transistor T1 and is simultaneously connected to the emitter of transistor T1 via another resistor R3; moreover, the emitter of transistor T1 is connected with the stabilized voltage $u_{STAB}$ by means of a resistor R5.

This circuit effects an integrating differentiation of the positive flank resulting at terminal 17, that is, at the terminal connection of the ignition lock switch, when the vehicle is turned on again (restarted).

The circuit functions as follows: When the ignition lock switch is switched off, zero potential or negative potential is applied to the terminal 17, provided that the supply voltage $U_{Batt}$ or the stabilized voltage Ustab, which is still derived from the latter, is connected to the microcomputer controlled system. Therefore, the divider point of the resistors R2 and R1 is approximately at ground potential and the capacitor C1 is discharged to the voltage level which results due to the divider effect by means of the grounded series connection of the resistors R5, R3 and R2 parallel to R1. In this state of the circuit (that is, when the terminal 17 of the ignition-lock switch is switched off), the transistor T1 is blocked, since its base potential is necessarily lower than its emitter potential and, in practice, the voltage Ustab is connected at the input 18b of the comparator via the resistor R4, that is, a higher voltage than the reference voltage.

In order to trigger the desired reset pulse, the driver of the vehicle starts the vehicle again, that is, actuates the ignition lock switch in any case, so that there is a positive voltage at the terminal 17, and the divider point of the resistors R1 and R2 increases in voltage to the given divider ratio, which is necessarily higher than the initial voltage of the capacitor C1 (simultaneously emitter potential of the transistor T1) for the purpose of triggering. Accordingly, the transistor T1 switches through and pulls the potential at the resistor R4 below the reference voltage $U_{ref}$—the comparator 18 switches and the triggering of the reset pulse is effected. At the same time, the capacitor C1 is charged at the divider potential of the resistors R5, R3, which is now changed, via the collector-emitter segment (and also the base-emitter segment), wherein the transistor T1 then blocks (reset pulse is terminated) as soon as the voltage falls below the necessary base-emitter voltage for switching through.

This state also no longer changes if the positive potential at the connection 17 is maintained, since, in any case, a current flows to ground via the resistor R3 when the capacitor C1 is correspondingly charged, and via the resistor R2, which resistor R2 biases the base-emitter segment of the transistor T1 in the blocking direction.

Such a reset circuit, which differentiates the positive turn-on voltage flank at the ignition lock switch so as to integrate, also meets the following requirements for triggering or releasing a reset pulse:
a triggering may likewise be effected when switching on the system, wherein the so-called power on reset pulse dominates;
the triggering is effected only during a switching cycle which effects a switching off and a subsequent switching on at the terminal 17 of the ignition lock switch, wherein the "0" position of the ignition lock switch corresponds to the "off" position in which the terminal 17 has no current, and the "1" or "2" position of the ignition lock switch can also comprise the starter actuation of the motor vehicle.

In addition, by means of correspondingly predetermining the triggering thresholds by means of the divider ratios of R1/R2 and R5/R3, as well as the dimensioning of the capacitor C1 with R4, the circuit can determine the duration of the preset pulse and can also ensure that the triggering of a reset for suppressing interference be connected to the following conditions:
a voltage at the ignition lock terminal 17 which drops for as long as desired to, e.g., follow 6 V, need not result in a triggering when increasing again to higher voltages, since possible voltage surges can not be ruled out during the driving operation;
when switching on terminal 17, that is, during a positive voltage increase at the terminal 17, the triggering of the reset pulse may only occur when a rise e.g. above 8 V is reached;
positive and negative interference peaks or short voltage surges and high-frequency irradiation need not result in triggering.

Therefore, the following behavior results in the present circuit during interference: If short voltage surges, for example, up to 0 V, and negative voltage peaks occur, the voltage at the divider point of the resistors R1 and R2 does drop briefly, but the capacitor C1 is only gradually discharged via the resistor R3; therefore, if the suge is brief, that is, if the discharge is small, then the transistor T1 can possibly switch through when the voltage at the connection 17 increases again, but it cannot pull the voltage across resistor R4 below the reference voltage because of the residual charge at the capacitor C1 which remains high.

If positive voltage peaks or long time voltage increases occur, then the voltage does indeed increase at the divider point of the resistors R1 and R2, so that the transistor T1 becomes conductive, but the voltage across resistor R4 cannot be pulled below the reference voltage because of the potential at the capacitor C1, which is already high, i.e. the possible current which is still drawn from the conductively connected transistor T1 is not great enough to produce the required voltage drop at the resistor R4 which could fall below the reference voltage.

In principle, a differentiating or integrating evaluation of the pulse coming from the ignition lock switch is possible; the embodiment example of FIG. 2, which concerns an integrating flank evaluation, is interference-resistant so that this possibility is preferred.

Integrating differentiation for the evaluation of the ignition lock switch pulse basically means any desired flank evaluation in which a pulse which is normally generated by means of differentiation is achieved, in this case, by means of an integration circuit.

Figure 2A:
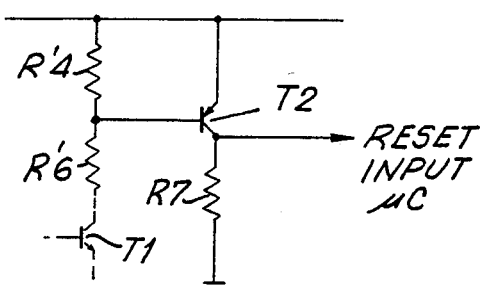
FIG. 2a shows a variant in the construction of a comparator in in the circuit of FIG. 2.

In addition, it is noted that the comparator 18 provided in FIG. 2 is to be understood as a circuit element in the broadest sense and can also be realized, for example, as a simple switching stage, as shown in FIG. 2a, wherein an additional transistor T2, which is constructed here as a p-n-p transistor, has its base connected with the connection point of resistors R'4, R'6 and its emitter is connected directly to the stabilized supply voltage Ustab and its collector is grounded via another resistor R7. A sufficient threshold effect accordingly results in the control of the p-n-p transistor T2 from the connection point of the resistors R'4 and R'6, so that the pulse resulting at the collector of the transistor T2 can be supplied to the reset input 11a of the microprocessor so as to reset it.

All of the characteristic features shown in the description, the following claims and the drawing can be substantial to the invention individually and in a desired combination with one another.

We claim:
1. A circuit for resetting computing devices of computer-controlled electrical control systems in motor vehicles, which computing devices are automatically connected to a supply voltage for a predetermined period of time controlled by the computing devices after switching-off an ignition lock switch of the motor vehicle, comprising evaluating means connected to a terminal of said ignition lock switch to produce a reset pulse for said computing devices in response to the switching-on of said switch during restarting of the vehicle, and independent of the automatic connection of said supply voltage to said computing devices, and wherein the switching-on of the ignition lock switch is evaluated by means of differentiation of a switch-on pulse on said terminal of the ignition lock switch.

2. A circuit according to claim 1, wherein the switch-on pulse of the ignition lock switch after the differentiation is compared at a comparator with a reference voltage value to generate a reset pulse at the output of the comparator when the differentiated switch-on pulse exceeds the reference voltage value.

3. A circuit according to claim 2 wherein said evaluation means includes a resistor, a semiconductor switching element and a capacitor connected in series to a source of stabilized voltage, said semiconductor switching element being controlled by the switching state on said ignition lock switch such that, for the differentiation, when the ignition lock switch is switched on during a positive switch-on pulse which causes the charging of said capacitor with a variable current and the corresponding variable voltage across said resistor is applied to said comparator where it is compared with said reference voltage value and the output of the comparator forms a reset pulse which is applied to a reset input of said computing devices.

4. A circuit according to claim 3 wherein said switching element is a transistor (T1), said reference voltage value (Uref) of predetermined magnitude is fed to one input (18a) of the comparator (18), and the variable voltage obtained by means of the differentiation of the positive switch-on pulse is fed to the other input (18b) of the comparator (18), and the connection point of a series connection of a resistor (R4) with the transistor (T1), is connected to this other input (18b).

5. A circuit according to claim 4, wherein a divider circuit of two input resistors (R1, R2) has a divider point connected to the base circuit of the transistor (T1); and the divider point of the two input resistors (R1, R2) is simultaneously connected with the emitter of the transistor (T1) by means of another resistor (R3), the emitter of the transistor (T1) being grounded by the capacitor (C1), and another resistor (R5) connecting the emitter of the transistor (T1) with the source of stabilized voltage (Ustab) in such a way that during an ingoing positive switch-on pulse from the ignition lock switch, the transistor (T1) first switches so as to conduct, charges the capacitor (C1), and simultaneously pulls the voltage at its collector below the reference voltage value (Uref) at the comparator (18) in order to trigger the reset pulse, with a subsequent blocking of the transistor when voltage across the capacitor rises above the voltage at said divider point connected to the base of the transistor.

6. A circuit according to claim 5, wherein the comparator consists of another semiconductor switching element which is switched on when a predetermined threshold value of the voltage originating from the first mentioned transistor (T1) is reached.

* * * * *